(12) United States Patent
Webb et al.

(10) Patent No.: US 12,508,006 B2
(45) Date of Patent: Dec. 30, 2025

(54) ULTRASOUND IMAGING GUIDANCE AND ASSOCIATED DEVICES, SYSTEMS, AND METHODS

(71) Applicant: KONINKLIJKE PHILIPS N.V., Eindhoven (NL)

(72) Inventors: Penelope Eugenia Webb, Somerville, MA (US); Grzegorz Andrzej Toporek, Cambridge, MA (US); Raghavendra Srinivasa Naidu, Auburndale, MA (US); Balasundar Iyyavu Raju, North Andover, MA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 203 days.

(21) Appl. No.: 17/908,005

(22) PCT Filed: Mar. 4, 2021

(86) PCT No.: PCT/EP2021/055409
§ 371 (c)(1),
(2) Date: Aug. 30, 2022

(87) PCT Pub. No.: WO2021/175965
PCT Pub. Date: Sep. 10, 2021

(65) Prior Publication Data
US 2023/0094631 A1    Mar. 30, 2023

Related U.S. Application Data

(60) Provisional application No. 62/985,596, filed on Mar. 5, 2020.

(51) Int. Cl.
*A61B 8/00*    (2006.01)

(52) U.S. Cl.
CPC ............ *A61B 8/585* (2013.01); *A61B 8/4263* (2013.01); *A61B 8/488* (2013.01); *A61B 8/5292* (2013.01)

(58) Field of Classification Search
CPC ......... A61B 8/488; A61B 8/4245; A61B 8/54; A61B 8/585; A61B 8/4263; A61B 8/5292;
(Continued)

(56) References Cited

U.S. PATENT DOCUMENTS

| 4,173,007 A | 10/1979 | McKeighen et al. |
| 6,280,387 B1 * | 8/2001 | Deforge ................... A61B 8/13 |
| | | 128/916 |

(Continued)

FOREIGN PATENT DOCUMENTS

| EP | 3332712 A1 | 6/2018 |
| JP | 2018134386 A | 8/2018 |

(Continued)

OTHER PUBLICATIONS

International Search Report and Written Opinion for PCT/EP2021/055409; Mailing date: May 17, 2021, 12 pages.

(Continued)

*Primary Examiner* — Oommen Jacob

(57) ABSTRACT

A guidance system is configured to detect a current pose of an ultrasound transducer and to determine a movement to achieve a desired pose associated with a desired view or imaging plane of a patients anatomy. In one embodiment, the guidance system includes a processor circuit in communication with the ultrasound transducer. The processor circuit is configured to: receive an input associated with a desired pose of the ultrasound transducer; receive ultrasound imaging data representative of a field of view of the ultrasound transducer in a current pose; determine a movement to align (Continued)

the current pose of the ultrasound transducer with the desired pose; and generate a graphical representation of the movement. The graphical representation shows both the current pose of the ultrasound transducer and the desired pose of the ultrasound transducer. The graphical representation is output to a display in communication with the processor circuit.

20 Claims, 9 Drawing Sheets

(58) Field of Classification Search
CPC ......... A61B 8/12; A61B 8/4254; A61B 8/465; A61B 8/469; A61B 8/485; A61B 8/0883
See application file for complete search history.

(56) References Cited

U.S. PATENT DOCUMENTS

| | | | | |
|---|---|---|---|---|
| 7,302,092 | B1* | 11/2007 | Fenster | G01S 15/8993 |
| | | | | 382/128 |
| 7,806,824 | B2* | 10/2010 | Ohtake | A61B 8/463 |
| | | | | 600/407 |
| 7,850,610 | B2* | 12/2010 | Ferek-Petric | A61B 8/5238 |
| | | | | 600/439 |
| 2003/0171668 | A1* | 9/2003 | Tsujino | G06T 7/12 |
| | | | | 600/407 |
| 2004/0019270 | A1* | 1/2004 | Takeuchi | A61B 8/14 |
| | | | | 600/407 |
| 2007/0236514 | A1* | 10/2007 | Agusanto | G06T 19/006 |
| | | | | 345/646 |
| 2008/0269604 | A1* | 10/2008 | Boctor | A61B 8/00 |
| | | | | 600/437 |
| 2010/0016710 | A1* | 1/2010 | Kumar | A61B 8/12 |
| | | | | 600/425 |
| 2010/0172559 | A1* | 7/2010 | Kumar | A61B 34/20 |
| | | | | 382/154 |
| 2012/0296202 | A1* | 11/2012 | Mountney | A61B 6/12 |
| | | | | 600/424 |
| 2013/0296707 | A1* | 11/2013 | Anthony | A61B 8/4254 |
| | | | | 600/459 |
| 2014/0343404 | A1* | 11/2014 | Razzaque | A61B 8/0841 |
| | | | | 600/424 |
| 2015/0310581 | A1 | 10/2015 | Radulescu et al. | |
| 2016/0296291 | A1* | 10/2016 | Chen | A61B 5/061 |
| 2017/0360403 | A1 | 12/2017 | Rothberg et al. | |
| 2018/0153505 | A1* | 6/2018 | Cadieu | A61B 8/4254 |
| 2018/0242946 | A1* | 8/2018 | Grbic | A61B 8/58 |
| 2019/0059851 | A1 | 2/2019 | Rothberg | |
| 2019/0117190 | A1* | 4/2019 | Djajadiningrat | G06T 19/006 |
| 2020/0078100 | A1* | 3/2020 | Weinstein | A61B 90/361 |
| 2021/0000446 | A1 | 1/2021 | Toporek et al. | |
| 2021/0015453 | A1 | 1/2021 | Toporek et al. | |
| 2021/0038321 | A1 | 2/2021 | Toporek et al. | |
| 2021/0265042 | A1 | 8/2021 | Kim et al. | |
| 2021/0369249 | A1 | 12/2021 | Toporek et al. | |
| 2023/0054610 | A1* | 2/2023 | Roundhill | G06Q 10/063 |
| 2023/0094631 | A1* | 3/2023 | Webb | A61B 8/4254 |
| | | | | 600/443 |

FOREIGN PATENT DOCUMENTS

| | | |
|---|---|---|
| WO | 2016209398 A1 | 12/2016 |
| WO | 2021058288 A1 | 4/2021 |

OTHER PUBLICATIONS

Bahner, D. P. et al., "Language of Transducer Manipulation", J Ultrasound Med., 2016, vol. 34, pp. 183-188.

* cited by examiner

242

ULTRASOUND IMAGING GUIDANCE AND ASSOCIATED DEVICES, SYSTEMS, AND METHODS

CROSS-REFERENCE TO PRIOR APPLICATIONS

This application is the U.S. National Phase application under 35 U.S.C. § 371 of International Application No. PCT/EP2021/055409, filed on Mar. 4, 2021, which claims the benefit of U.S. Provisional Patent Application No. 62/985,596, filed on Mar. 5, 2020. These applications are hereby incorporated by reference herein.

TECHNICAL FIELD

The present disclosure relates generally to the acquisition and processing of ultrasound images and, in particular, to systems and methods for guiding ultrasound imaging procedures based on obtained ultrasound images.

BACKGROUND

Ultrasound imaging is frequently used to obtain images of internal anatomical structures of a patient. Ultrasound systems typically comprise an ultrasound transducer probe that includes a transducer array coupled to a probe housing. The transducer array is activated to vibrate at ultrasonic frequencies to transmit ultrasonic energy into the patient's anatomy, and then receive ultrasonic echoes reflected or backscattered by the patient's anatomy to create an image. Such transducer arrays may include various layers, including some with piezoelectric materials, which vibrate in response to an applied voltage to produce the desired pressure waves. These transducers may be used to successively transmit and receive several ultrasonic pressure waves through the various tissues of the body. The various ultrasonic responses may be further processed by an ultrasonic imaging system to display the various structures and tissues of the body.

A sonographer may desire to obtain an ultrasound image representative of a particular view or imaging plane of an organ in order to evaluate the condition of the organ and/or make measurements of the organ. For example, particular acoustic imaging windows of a heart that a sonographer may desire to obtain include "apical," "subcostal" (subxiphoid), "parasternal," and "suprasternal" windows. Standard imaging planes or views that the sonographer may obtain at each access window include: apical four chamber (A4C), apical two chamber (A2C), apical three chamber (A3C), apical five chamber (A5C), parasternal long axis (PLAX), parasternal short axis (PSSA), subcostal long axis (SCLA), and subcostal four chamber (SC4C) views. At each view, one or more subviews might also be acquired including parasternal short axis view at mitral valve, aortic valve, apex, and papillary muscle level. Obtaining these views involves positioning an ultrasound probe at a specific region of the patient's body and orienting the probe to obtain an image at a desired view. The movements used by the sonographer to position and orient the probe may be complex and may involve several degrees of freedom in three-dimensional space. Accordingly, it can be challenging for inexperienced sonographers to achieve the desired view.

SUMMARY

Aspects of the present disclosure provide guidance for ultrasound imaging systems, and associated devices and methods. In an exemplary embodiment, a guidance system is configured to detect a current position and orientation (pose) of an ultrasound transducer, and to determine a movement to achieve a desired pose associated with a desired view or imaging plane of a patient's anatomy. In an exemplary embodiment, a processor circuit detects the current pose of the ultrasound transducer based on ultrasound imaging data obtained by the ultrasound transducer, and identifies a pose associated with a desired view (e.g., apical view) of the anatomy. In some embodiments, the desired pose may be determined using model-based approaches, artificial intelligence, machine learning, neural networks, etc. Based on the determined movement, the processor circuit generates a graphical user interface, such as a two-dimensional graphical user interface or a three-dimensional graphical user interface, that includes a first indicator representative of the current pose of the ultrasound transducer, and a second indicator representative of the desired pose of the ultrasound transducer to achieve the desired view of the patient's anatomy. The second indicator is positioned and oriented relative to the first indicator to illustrate one or more adjustments associated with the movement, such as lateral sliding, sweeping, rotating, rocking, fanning, and/or compression. In that regard, embodiments of the present disclosure advantageously provide an intuitive, probe-centric interface for guiding an ultrasound imaging procedure that involves fewer mental operations or translations for an operator to follow on-screen instructions to move the ultrasound transducer.

According to one embodiment of the present disclosure, an apparatus for guiding an ultrasound imaging procedure includes a processor circuit configured for communication with an ultrasound transducer. The processor circuit is configured to: receive, from a user interface, an input associated with a desired pose of the ultrasound transducer, wherein the ultrasound transducer is positioned at a current pose; receive, from the ultrasound transducer, ultrasound imaging data representative of a field of view of the ultrasound transducer in the current pose; determine, based on the ultrasound imaging data and the input, a movement to align the current pose of the ultrasound transducer with the desired pose; and generate a graphical representation of the movement. The graphical representation includes a first indicator of the current pose of the ultrasound transducer and a second indicator of the desired pose of the ultrasound transducer positioned and oriented relative to the first indicator to indicate the movement. The processor circuit is further configured to output the graphical representation to a display in communication with the processor circuit.

In some embodiments, the processor circuit is configured to detect a change in the current pose of the ultrasound transducer and update at least one of the first indicator or the second indicator of the graphical representation based on the detected change in the current pose. In some embodiments the processor circuit is configured to update, in real time, the first indicator based on the detected change in the current pose. In some embodiments, the processor circuit is configured to detect the change in the current pose of the ultrasound transducer based on the ultrasound imaging data using a machine learning algorithm. In some embodiments, the apparatus further comprises a position sensor configured to obtain position data of the ultrasound transducer, and the processor circuit is configured to detect the change in the current pose of the ultrasound transducer based on the position data. In some embodiments, the first indicator and the second indicator comprise a same shape. In some embodiments, the movement comprises two or more adjustments of the ultrasound transducer including a lateral sliding movement, a sweeping movement, a rocking movement, a fanning movement, a rotational movement, a compression movement, or a decompression movement. In some embodiments, the second indicator graphically represents the two or more adjustments of the ultrasound transducer simultaneously.

In some embodiments the user interface comprises a touch-screen display, and wherein the input is received based on a view selected on the touch-screen display. In some embodiments the second indicator comprises a gradient representative of at least one of a rocking movement or a fanning movement. In some embodiments the processor circuit is configured to: determine that the current pose of the ultrasound transducer is aligned with the desired pose; and in response to determining that the current pose is aligned with the desired pose, save, to a memory of the processor circuit, an image frame.

According to another embodiment of the present disclosure, a method for guiding an ultrasound imaging procedure includes: receiving, from a user interface, an input associated with a desired pose of an ultrasound transducer, wherein the ultrasound transducer is positioned at a current pose; receiving, from the ultrasound transducer, ultrasound imaging data representative of a field of view of the ultrasound transducer in a current pose; determining, based on the ultrasound imaging data and the input, a movement to align the current pose of the ultrasound transducer with the desired pose; and generating a graphical representation of the movement. The graphical representation comprises: a first indicator of the current pose of the ultrasound transducer; and a second indicator of the desired pose of the ultrasound transducer positioned and oriented relative to the first indicator to indicate the movement. The method further includes outputting the graphical representation to a display.

In some embodiments, the method further comprises detecting a change in the current pose of the ultrasound transducer; and updating at least one of the first indicator or the second indicator of the graphical representation based on the detected change in the current pose. In some embodiments, updating the at least one of the first indicator or the second indicator comprises updating, in real time, the first indicator based on the detected change in the current pose. In some embodiments, detecting the change in the current pose of the ultrasound transducer comprises detecting the change in the current pose of the ultrasound transducer based on the ultrasound imaging data using a machine learning architecture. In some embodiments, detecting the change in the current pose of the ultrasound transducer comprises detecting the change in the current pose of the ultrasound transducer based on position data received from a position sensor.

In some embodiments, the first indicator and the second indicator comprise a same shape. In some embodiments, the movement comprises two or more adjustments of the ultrasound transducer including a lateral sliding movement, a sweeping movement, a rocking movement, a fanning movement, a rotational movement, or a compression movement, and wherein the second indicator graphically represents the two or more adjustments of the ultrasound transducer simultaneously. In some embodiments, the second indicator comprises a gradient representative of at least one of a rocking movement or a fanning movement. In some embodiments, the method further includes: determining that the current pose of the ultrasound transducer is aligned with the desired pose; and in response to determining that the current pose is aligned with the desired pose, saving, to a memory device, an image frame.

According to another embodiment of the present disclosure, an ultrasound imaging system includes: an ultrasound probe comprising an ultrasound transducer array; a user display configured to display a graphical user interface; a user interface device configured to receive one or more inputs; and a processor circuit in communication with the ultrasound probe, the user interface device, and the user display. The processor circuit is configured to: receive, from the user interface, an input associated with a desired pose of the ultrasound transducer, wherein the ultrasound transducer is positioned at a current pose; receive, from the ultrasound transducer, ultrasound imaging data representative of a field of view of the ultrasound transducer in the current pose; determine, based on the ultrasound imaging data, the current pose of the ultrasound probe; compute, based on the current pose and the desired pose, a movement to align the current pose of the ultrasound probe with the desired pose; and generate a graphical representation of the movement. The graphical representation comprises: a coordinate system; a first indicator of the current pose of the ultrasound probe overlaid on the coordinate system; and a second indicator of the desired pose of the ultrasound probe overlaid on the coordinate system and positioned and oriented relative to the first indicator to indicate the movement. The processor circuit is further configured to output the graphical representation to the user display.

Additional aspects, features, and advantages of the present disclosure will become apparent from the following detailed description.

BRIEF DESCRIPTION OF THE DRAWINGS

Illustrative embodiments of the present disclosure will be described with reference to the accompanying drawings, of which.

DETAILED DESCRIPTION

Figure 1:
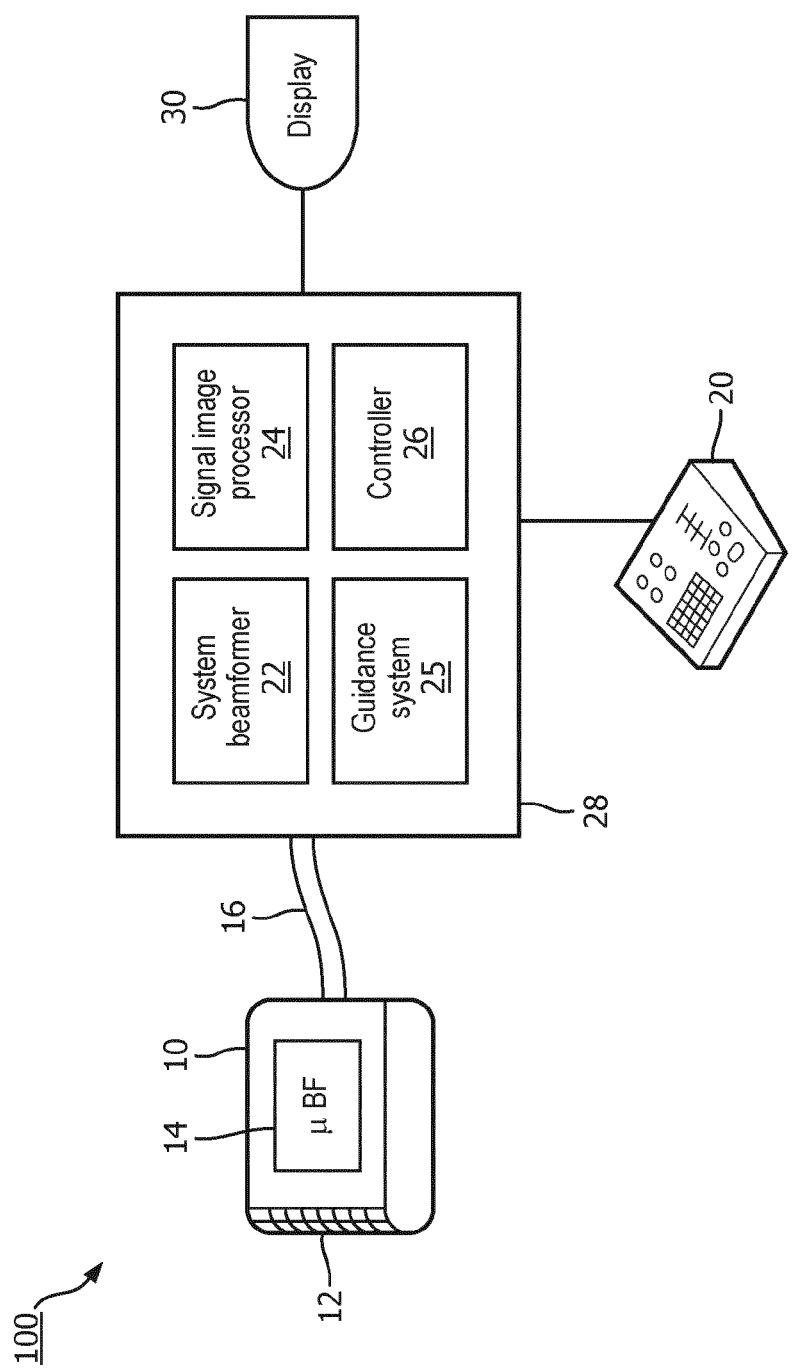
FIG. 1 is a schematic diagram of an ultrasound imaging system, according to embodiments of the present disclosure.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

In FIG. 1, an ultrasound system 100 according to embodiments of the present disclosure is shown in block diagram form. An ultrasound probe 10 has a transducer array 12 comprising a plurality of ultrasound transducer elements or acoustic elements. In some instances, the array 12 may include any number of acoustic elements. For example, the array 12 can include between 1 acoustic element and 100,000 acoustic elements, including values such as 2 acoustic elements, 4 acoustic elements, 36 acoustic elements, 64 acoustic elements, 128 acoustic elements, 300 acoustic elements, 812 acoustic elements, 3000 acoustic elements, 9000 acoustic elements, 30,000 acoustic elements, 65,000 acoustic elements, and/or other values both larger and smaller. In some instances, the acoustic elements of the array 12 may be arranged in any suitable configuration, such as a linear array, a planar array, a curved array, a curvilinear array, a circumferential array, an annular array, a phased array, a matrix array, a one-dimensional (1D) array, a 1.x dimensional array (e.g., a 1.5 D array), or a two-dimensional (2D) array. The array of acoustic elements (e.g., one or more rows, one or more columns, and/or one or more orientations) can be uniformly or independently controlled and activated. The array 12 can be configured to obtain one-dimensional, two-dimensional, and/or three-dimensional images of patient anatomy.

Although the present disclosure refers to synthetic aperture external ultrasound imaging using an external ultrasound probe, it will be understood that one or more aspects of the present disclosure can be implemented in any suitable ultrasound imaging probe or system, including external ultrasound probes and intraluminal ultrasound probes. For example, aspects of the present disclosure can be implemented in ultrasound imaging systems using a mechanically-scanned external ultrasound imaging probe, an intracardiac (ICE) echocardiography catheter and/or a transesophageal echocardiography (TEE) probe, a rotational intravascular ultrasound (IVUS) imaging catheter, a phased-array IVUS imaging catheter, a transthoracic echocardiography (TTE) imaging device, or any other suitable type of ultrasound imaging device.

Figure 2:
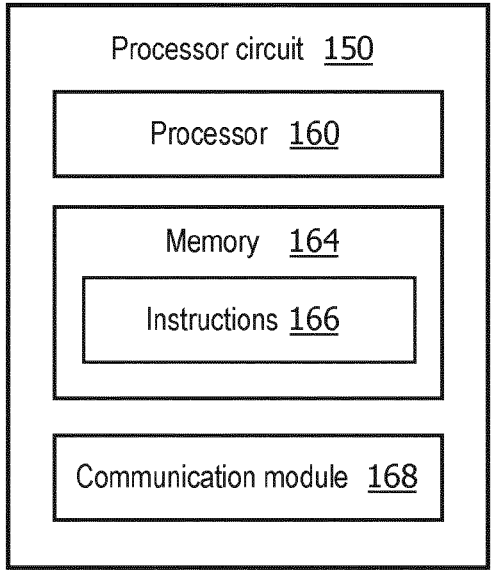
FIG. 2 is a schematic diagram of a processor circuit, according to embodiments of the present disclosure.

Referring again to FIG. 1, the acoustic elements of the array 12 may comprise one or more piezoelectric/piezoresistive elements, lead zirconate titanate (PZT), piezoelectric micromachined ultrasound transducer (PMUT) elements, capacitive micromachined ultrasound transducer (CMUT) elements, and/or any other suitable type of acoustic elements. The one or more acoustic elements of the array 12 are in communication with (e.g., electrically coupled to) electronic circuitry 14. In some embodiments, such as the embodiment of FIG. 1, the electronic circuitry 14 can comprise a microbeamformer (μBF). In other embodiments, the electronic circuitry comprises a multiplexer circuit (MUX). The electronic circuitry 14 is located in the probe 10 and communicatively coupled to the transducer array 12. In some embodiments, one or more components of the electronic circuitry 14 can be positioned in the probe 10. In some embodiments, one or more components of the electronic circuitry 14, can be positioned in a computing device or processing system 28. The computing device 28 may be or include a processor, such as one or more processors in communication with a memory. As described further below, the computing device 28 may include a processor circuit as illustrated in FIG. 2. In some aspects, some components of the electronic circuitry 14 are positioned in the probe 10 and other components of the electronic circuitry 14 are positioned in the computing device 28. The electronic circuitry 14 may comprise one or more electrical switches, transistors, programmable logic devices, or other electronic components configured to combine and/or continuously switch between a plurality of inputs to transmit signals from each of the plurality of inputs across one or more common communication channels. The electronic circuitry 14 may be coupled to elements of the array 12 by a plurality of communication channels. The electronic circuitry 14 is coupled to a cable 16, which transmits signals including ultrasound imaging data to the computing device 28.

In the computing device 28, the signals are digitized and coupled to channels of a system beamformer 22, which appropriately delays each signal. The delayed signals are then combined to form a coherent steered and focused receive beam. System beamformers may comprise electronic hardware components, hardware controlled by software, or a microprocessor executing beamforming algorithms. In that regard, the beamformer 22 may be referenced as electronic circuitry. In some embodiments, the beamformer 22 can be a system beamformer, such as the system beamformer 22 of FIG. 1, or it may be a beamformer implemented by circuitry within the ultrasound probe 10. In some embodiments, the system beamformer 22 works in conjunction with a microbeamformer (e.g., electronic circuitry 14) disposed within the probe 10. The beamformer 22 can be an analog beamformer in some embodiments, or a digital beamformer in some embodiments. In the case of a digital beamformer, the system includes A/D converters which convert analog signals from the array 12 into sampled digital echo data. The beamformer 22 generally will include one or more microprocessors, shift registers, and or digital or analog memories to process the echo data into coherent echo signal data. Delays are effected by various means such as by the time of sampling of received signals, the write/read interval of data temporarily stored in memory, or by the length or clock rate of a shift register as described in U.S. Pat. No. 4,173,007 to McKeighen et al., the entirety of which is hereby incorporated by reference herein. Additionally, in some embodiments, the beamformer can apply appropriate weight to each of the signals generated by the array 12. The beamformed signals from the image field are processed by a signal and image processor 24 to produce 2D or 3D images for display on an image display 30. The signal and image processor 24 may comprise electronic hardware components, hardware controlled by software, or a microprocessor executing image processing algorithms. It generally will also include specialized hardware or software which processes received echo data into image data for images of a desired display format such as a scan converter. In some embodiments, beamforming functions can be divided between different beamforming components. For example, in some embodiments, the system 100 can include a microbeamformer located within the probe 10 and in communication with the system beamformer 22. The microbeamformer may perform preliminary beamforming and/or signal processing that can reduce the number of communication channels required to transmit the receive signals to the computing device 28.

Control of ultrasound system parameters such as scanning mode (e.g., B-mode, M-mode), probe selection, beam steering and focusing, and signal and image processing is done under control of a system controller 26 which is coupled to various modules of the system 100. The system controller 26 may be formed by application specific integrated circuits (ASICs) or microprocessor circuitry and software data storage devices such as RAMs, ROMs, or disk drives. In the case of the probe 10, some of this control information may be provided to the electronic circuitry 14 from the computing device 28 over the cable 16, conditioning the electronic circuitry 14 for operation of the array as required for the particular scanning procedure. The user inputs these operating parameters by means of a user interface device 20.

In some embodiments, the image processor 24 is configured to generate images of different modes to be further analyzed or output to the display 30. For example, in some embodiments, the image processor can be configured to compile a B-mode image, such as a live B-mode image, of an anatomy of the patient. In other embodiments, the image processor 24 is configured to generate or compile an M-mode image. An M-mode image can be described as an image showing temporal changes in the imaged anatomy along a single scan line.

It will be understood that the computing device 28 may comprise hardware circuitry, such as a computer processor, application-specific integrated circuit (ASIC), field-programmable gate array (FPGA), capacitors, resistors, and/or other electronic devices, software, or a combination of hardware and software. In some embodiments, the computing device 28 is a single computing device. In other embodiments, the computing device 28 comprises separate computer devices in communication with one another.

The computing device 28 further includes a guidance system 25, which is used to generate and output guidance instructions for a user to move the ultrasound probe 10 to a desired or selected pose. The guidance system 25 may be configured to receive various inputs from the system, including inputs from the interface device 20, ultrasound imaging data from the ultrasound probe 10, the system beamformer 22, and/or the signal and image processor 24. In some embodiments, the guidance system 25 is configured to receive an input from the interface device 20 corresponding to a desired or selected view of anatomy. The desired or selected view of the anatomy comprises, or is associated with, a desired or selected pose of the ultrasound probe 10. The guidance system 25 may determine, based on ultrasound imaging data and/or position data from a positioning system or sensor (e.g., medical positioning system (MPS), optical image sensor, accelerometer, gyroscope), a current pose of the ultrasound probe 10. For example, in some embodiments, the guidance system 25 includes an optical imaging sensor, such as a camera, and the position data comprises images of the ultrasound probe positioned relative to the patient. In this embodiment, the guidance system is configured to determine, by image processing the images, the pose of the ultrasound probe relative to the anatomy of the patient.

In one embodiment, the guidance system 25 determines the pose of the ultrasound probe 10 in terms of one or more physical dimensions relative to the anatomy. For example, the guidance system 25 may determine the pose of the probe in terms of x-y-z coordinates, rocking angle, fanning angle, rotation angle, etc., relative to the anatomy. In some embodiments, the guidance system 25 employs an anatomical model to determine the current pose of the ultrasound probe 10. In some embodiments, the guidance system 25 is configured to determine the current pose using various image processing techniques, including artificial intelligence (A.I.), machine learning, deep learning, and/or neural network architectures. For example, in some embodiments, a convolution neural network (CNN) is used. Based on the determined current pose of the ultrasound probe 10 and the selected or desired pose, the guidance system 25 computes a movement to align the current pose of the ultrasound probe 10 with the desired pose, and outputs a graphical representation of the movement to the display 30.

FIG. 2 is a schematic diagram of a processor circuit 150, according to embodiments of the present disclosure. The processor circuit 150 may be implemented in the computing device 28, the signal and image processor 24, the controller 26, and/or the probe 10 of FIG. 1. As shown, the processor circuit 150 may include a processor 160, a memory 164, and a communication module 168. These elements may be in direct or indirect communication with each other, for example via one or more buses.

The processor 160 may include a central processing unit (CPU), a digital signal processor (DSP), an ASIC, a controller, an FPGA, another hardware device, a firmware device, or any combination thereof configured to perform the operations described herein. The processor 160 may also be implemented as a combination of computing devices, e.g., a combination of a DSP and a microprocessor, a plurality of microprocessors, one or more microprocessors in conjunction with a DSP core, or any other such configuration.

The memory 164 may include a cache memory (e.g., a cache memory of the processor 160), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 164 includes a non-transitory computer-readable medium. The memory 164 may store instructions 166. The instructions 166 may include instructions that, when executed by the processor 160, cause the processor 160 to perform the operations described herein with reference to the computing device 28 and/or the probe 10 (FIG. 1). Instructions 166 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication module 168 can include any electronic circuitry and/or logic circuitry to facilitate direct or indirect communication of data between the computing device 28, the probe 10, and/or the display 30. In that regard, the communication module 168 can be an input/output (I/O) device. In some instances, the communication module 168 facilitates direct or indirect communication between various elements of the processor circuit 150 and/or the processing system 106 (FIG. 1A).

A sonographer may desire to obtain an ultrasound image representative of a particular view or imaging plane of an organ (e.g., apical view of the heart) in order to evaluate the condition of the organ and/or make measurements of the organ. However, the movements involved to position and orient the probe may be complex and may include adjustments in several degrees of freedom in three-dimensional space. Thus, it can be challenging for inexperienced sonographers to achieve the desired view. A guidance scheme or procedure may be used to position the ultrasound probe at a desired position and orientation (i.e., pose). Accordingly, the present disclosure describes a guidance interface that displays the movements associated with the desired view in an intuitive manner that involves fewer mental translations for the sonographer.

Figure 3:
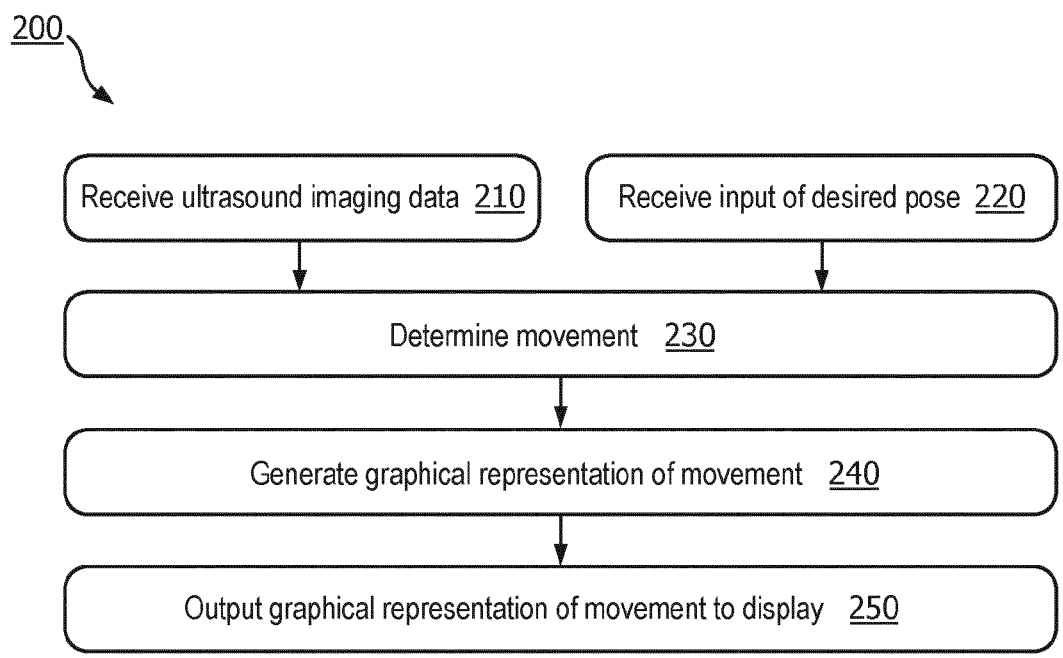
FIG. 3 is a flow diagram of a method for generating a graphical user interface for guiding an ultrasound imaging procedure, according to aspects of the present disclosure.

FIG. 3 is a flow diagram illustrating a method 200 for providing image-based guidance to achieve a desired view using an ultrasound probe and a display. It will be understood that the method 200 may be performed using an ultrasound imaging device and/or an ultrasound imaging system, such as the system 100 shown in FIG. 1. For example, one or more steps of the method 200 may be performed using the guidance system 25 of the system 100 as described above, which may include one or more features of the processor circuit 150 described with respect to FIG. 2.

In step 210, a processor circuit of a guidance system receives ultrasound imaging data representative of a field of view obtained by an ultrasound imaging transducer. The ultrasound imaging data may comprise raw analog ultrasound signals, digital ultrasound signals or data, filtered data, beamformed data, or any other suitable type of data. In some embodiments, the ultrasound imaging data may include B-mode data obtained by an imaging probe or imaging device. In some embodiments, the ultrasound imaging data may include Doppler data such as power Doppler or color Doppler, M-mode data, or any other suitable type of imaging data.

In step 220 the processor circuit receives an input indicating a desired pose of the ultrasound transducer, where the desired pose represents the position and/or orientation of the ultrasound transducer associated with a desired view, such as the apical view of the heart. As stated above, the desired pose may be represented by positional information that includes values associated with one or more physical dimensions or geometric parameters, such as x-y-z coordinates, angles (e.g., fanning, rotation, rocking), spherical coordinates, cylindrical coordinates, etc. The desired pose and/or positional information may be stored in a memory of the processor circuit and recalled or retrieved from the memory in response to receiving the input.

Figure 4A:
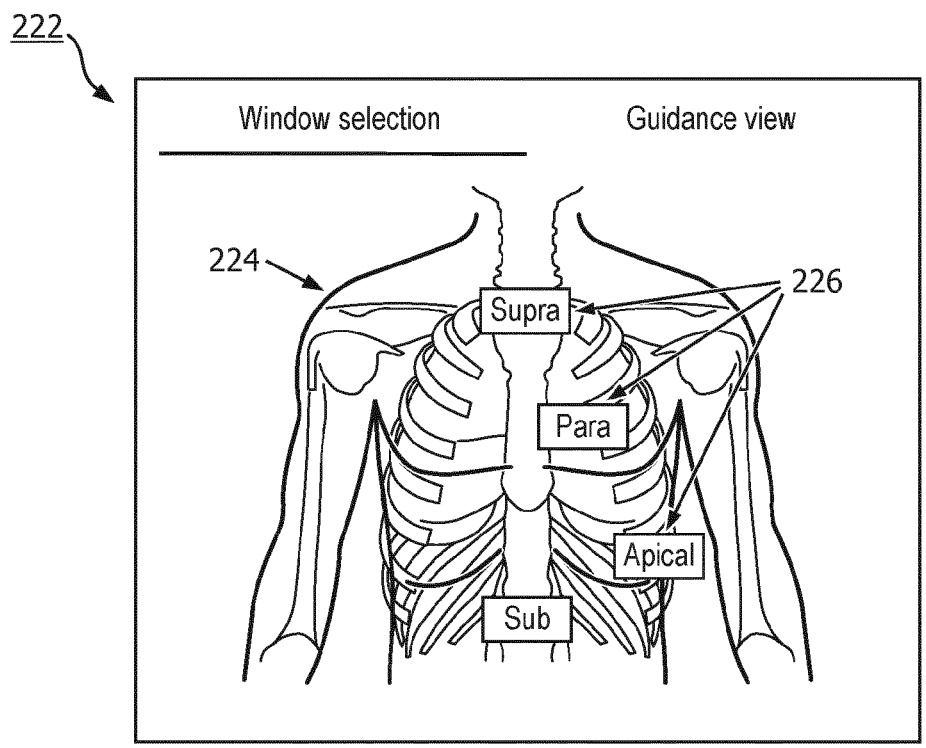
FIG. 4A is a graphical user interface of a view selection step of an image-guided ultrasound imaging procedure, according to aspects of the present disclosure.

The input may be received by the processor circuit from a user interface device, such as the user interface of the system 100 shown in FIG. 1. In some embodiments, the user interface device comprises a touch-screen display that shows a graphical display or interface including a list or selection of different echocardiography imaging windows. In some embodiments, the user interface device comprises a touchless, augmented reality display (e.g., glasses or screen), such as a HOLOLENS display manufactured by Microsoft, Inc. FIG. 4A illustrates a graphical user interface 222 used for receiving an input indicating a desired window. The graphical interface includes a diagrammatic view 224 of a patient's anatomy and a plurality of window indicators 226 overlaid at corresponding locations of the anatomy 224 in the interface. The user may select an input by tapping on a window indicator 226 on a touch screen display, using a mouse, trackball, keyboard input, voice command, or any other suitable type of input. In some embodiments, once the window indicator 226 is selected, a set of views—typically defined by the scanning protocol—is displayed in the form of view indicators. For example, if an apical window is selected, the user may be provided an option to switch between A4C, A2C, A3C, or A5C views by selecting the associated view indicator. In some embodiments, if no view selection is provided by the user, the system automatically selects a commonly used or predefined view that is obtainable in a previously selected acoustic window. In some embodiments, once the user selects the window indicator 226, an example of a standard view is shown to the user. In some embodiments, the example standard view comprises a previously-acquired image obtained at the selected window and/or view. In some embodiments, the example standard view is an illustration or cartoon of the standard view. The example standard view may be saved to a memory in communication with the processor. In some embodiments, the indicators 226 comprise view indicators. In some embodiments, the indicators 226 comprise a combination of window indicators and view indicators.

In some embodiments, the input selecting the window and/or view is automatically created using an image processing algorithm. For example, the processor circuit may determine, by image processing of the ultrasound imaging signals, a pose of the ultrasound transducer relative to the anatomy of the patient and automatically selects a window or view based on the determined pose. For example, the processor circuit may generate the input based on a view which the ultrasound transducer is closest to achieving. In another example, the processor circuit may determine—using classification algorithm—a type of an acoustic window, and select such window based on the prediction.

Figure 4B:
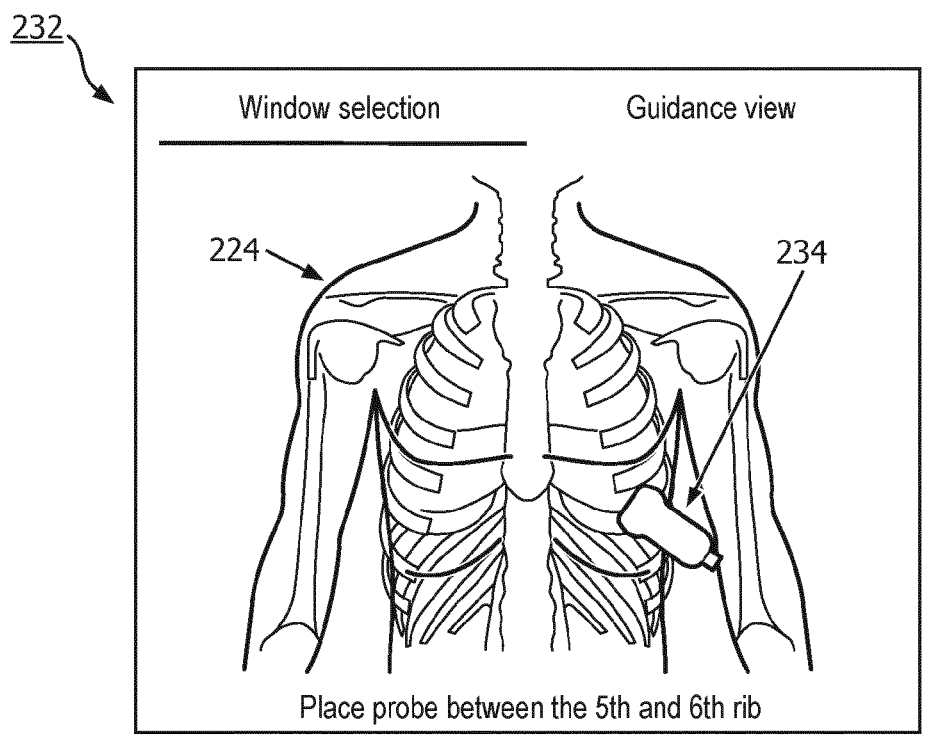
FIG. 4B is a graphical user interface of a view selection step of an image-guided ultrasound imaging procedure, according to aspects of the present disclosure.

In some embodiments, once the desired pose or view is received or determined by the processor circuit, the processor circuit outputs a user instruction to place the ultrasound transducer at a particular position and/or orientation on the patient's anatomy. FIG. 4B shows an exemplary graphical user interface 232 that shows a diagrammatic view of a patient's anatomy and an ultrasound probe or ultrasound transducer positioned with the desired pose relative to the anatomy 224 of the patient. The graphical user interface includes in indicator 234 of the ultrasound transducer as well as a textual instruction corresponding to the indicator. In some embodiments, the graphical user interface 232 includes only of the indicator 234 of the ultrasound transducer or the textual instruction. In other embodiments, the user instruction includes an audible instruction, a haptic instruction, or any other suitable type of instruction.

In some embodiments, the processor circuit receives the input indicating the desired pose or imaging plane before receiving the ultrasound imaging data. For example, the sonographer may begin the imaging procedure by selecting the desired window and/or view (e.g., apical window and A4C view), and then position the transducer to obtain the ultrasound imaging data. In some embodiments, the processor circuit is configured to receive a continuous stream of ultrasound imaging data, and may receive the input indicating the desired view simultaneously with the ultrasound imaging data.

In step 230, the processor circuit determines, based on the ultrasound imaging data received in step 210 and the input received in step 220, a movement to align the current pose of the ultrasound transducer with the desired pose. In other words, step 230 includes determining a movement to achieve the view or pose associated with the input received in step 220. In an exemplary embodiment, step 230 includes determining the current pose of the ultrasound transducer by image processing the ultrasound imaging data. In some embodiments, the processor circuit uses artificial intelligence (A.I.), machine learning, and/or deep learning architectures to determine the current pose of the ultrasound transducer. In one embodiment, a convolutional neural network (CNN) architecture is trained to predict a relative pose of the ultrasound transducer in respect to a predefined reference plane. Such algorithms are described in, for example, U.S. Provisional Patent Application No. 62/641,540, titled "ULTRASOUND IMAGING PLANE GUIDANCE FOR NEURAL NETWORKS AND ASSOCIATED DEVICES, SYSTEMS, AND METHODS," filed Mar. 12, 2018, U.S. Provisional Patent Application No. 62/641,508, titled "ULTRASOUND IMAGING PLANE ALIGNMENT USING NEURAL NETWORKS AND ASSOCIATED DEVICES, SYSTEMS, AND METHODS," filed Mar. 12, 2018, U.S. Provisional Patent Application No. 62/641,493, titled "ULTRASOUND IMAGING DATASET ACQUISITION FOR NEURAL NETWORK TRAINING AND ASSOCIATED DEVICES, SYSTEMS, AND METHODS," filed Mar. 12, 2018, U.S. Provisional Patent Application No. 62/700,960, titled "ULTRASOUND IMAGING BY DEEP LEARNING AND ASSOCIATED DEVICES, SYSTEMS, AND METHODS," filed Jul. 20, 2018, U.S. Patent Application No. 62/906,368, titled "AUTOMATIC CLOSED-LOOP ULTRASOUND PLANE STEERING FOR TARGET LOCALIZATION IN ULTRASOUND IMAGING AND ASSOCIATED DEVICES, SYSTEMS, AND METHODS," filed Sep. 26, 2019, and U.S. Patent Application No. 62/746,042 titled "DEEP LEARNING-BASED ULTRASOUND IMAGING GUIDANCE AND ASSOCIATED DEVICES, SYSTEMS, AND METHODS," filed Oct. 16, 2018, each of which is hereby incorporated by reference in its entirety.

Figure 5:
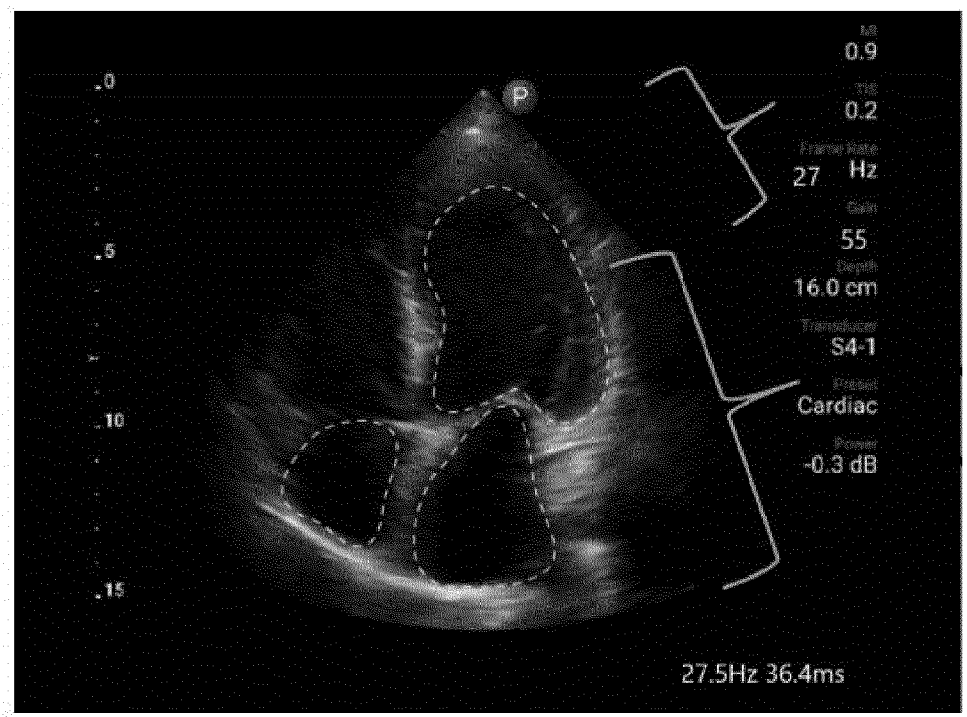
FIG. 5 is a diagrammatic view of a view identification algorithm applied to an ultrasound image obtained during an image-guided ultrasound imaging procedure, according to aspects of the present disclosure.

In that regard, FIG. 5 is a diagrammatic view of an ultrasound image 242 being processed according to an algorithm to determine the current pose of the ultrasound transducer. The image 242 includes outlines 244 of anatomical features, such as organs, chambers of the heart, etc., that may be used to identify the current pose or view of the ultrasound transducer in combination with anatomical features, such as mitral valve, aortic valve, septum, etc. The processor circuit may employ one or more of the architectures described above, including A.I., machine learning, deep learning, and/or neural networks. In some embodiments, the identified anatomical features may be compared to a model of anatomical features to determine the current pose or view. In some embodiments, a state machine comprising a plurality of exemplary image frames associated with a plurality of different poses or views is used to determine the current pose or view of the ultrasound transducer with respect to the patient's anatomical features.

With the current pose or view of the ultrasound transducer determined by the processor circuit, the processor circuit determines a movement of the ultrasound transducer to achieve the desired pose or view. The movement may involve or include a number of physical adjustments in one or more degrees of freedom. The movement may be determined by comparing the current pose to the desired pose. In that regard, the processor may determine a plurality of dimensional values associated with the current pose, such as x-y-z coordinates, rotational angle, fanning angle, rocking angle, etc. These dimensional values can then be compared to the dimensional values associated with the desired pose, such as x-y-z coordinates, rotational angle, fanning angle, rocking angle, etc. The movement can then be determined based on this comparison by, for example, a subtraction of the dimensional values of the current pose from the dimensional values of the desired prose. Accordingly, in some embodiments, the movement is determined based on a direct comparison of the current pose to the desired pose. In other embodiments, the movement is computed by determining the current pose of the ultrasound transducer in a reference coordinate system, and comparing the current pose in the reference coordinate system with the desired pose in the reference coordinate system.

In step 240, the processor circuit generates a graphical representation of the movement determined in step 230. The graphical indicator may include a first indicator of the current pose of the ultrasound transducer and a second indicator of the desired pose of the ultrasound transducer positioned an oriented relative to the first indicator to indicate the movement. One or both of the indicators may indicate the movement such that one or more adjustments in one or more degrees of freedom are shown. In some embodiments, multiple adjustments in multiple degrees of freedom are shown illustrated by the first and/or second indicator.

Figure 6:
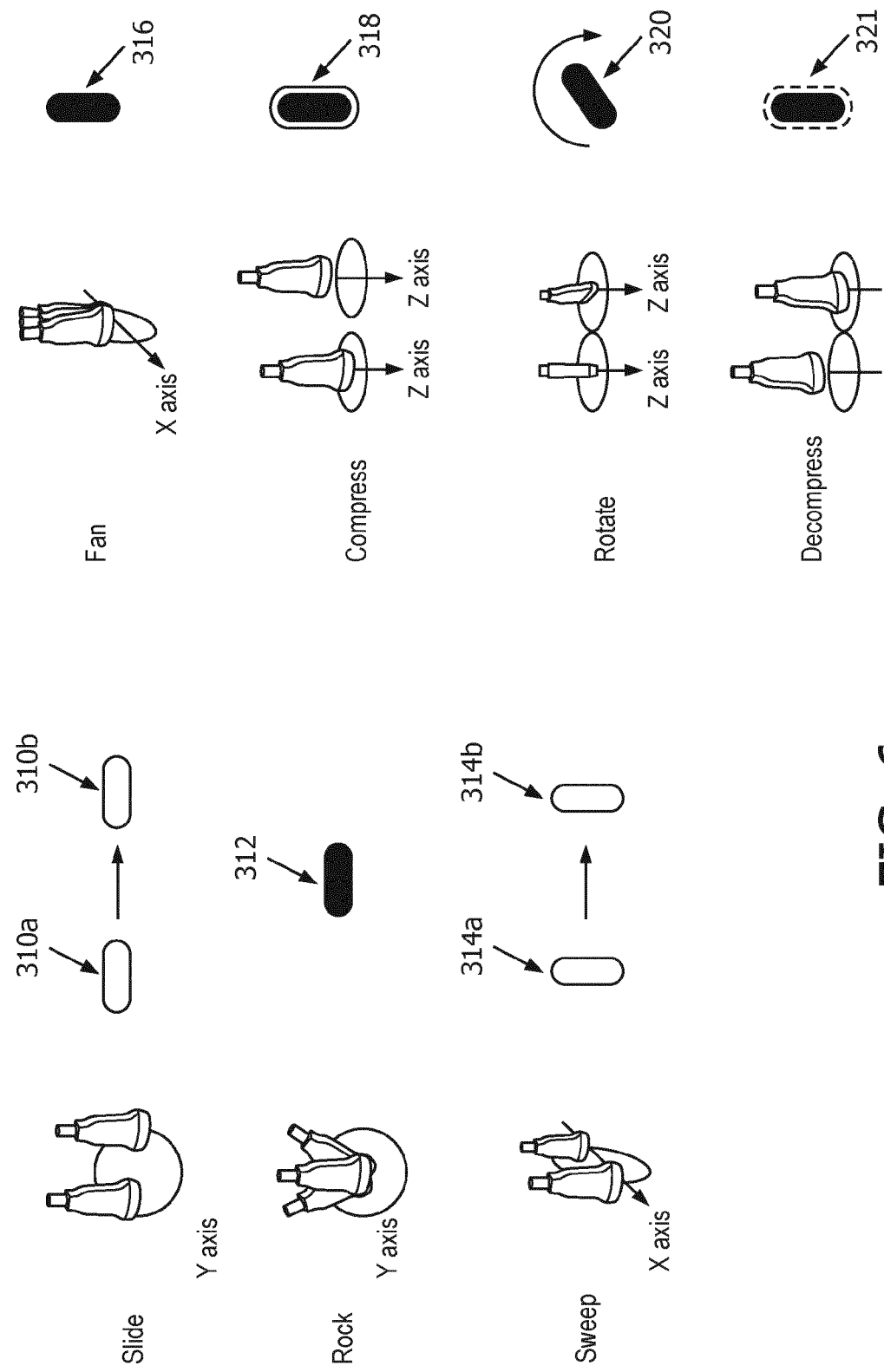
FIG. 6 is a diagrammatic view of various types of ultrasound probe movements determined during an image-guided ultrasound imaging procedure, according to aspects of the present disclosure.

FIG. 6 is a diagrammatic view of a plurality of ultrasound transducer movements and the graphical indicators associated with the movements. The shapes of the graphical indicators may approximate or represent the ultrasound transducer array of the ultrasound transducer. The movements include sliding, rocking, sweeping, fanning, compression, and rotation. Sliding involves a lateral translation of the transducer in which the angular orientation of the ultrasound transducer remains substantially unchanged. The sliding movement is shown as a lateral translation that includes a first indicator 310a of the ultrasound transducer laterally spaced from a second indicator 310b representative of the desired lateral position. Rocking involves a lateral tilt of the ultrasound transducer along a lateral axis (i.e. the longer dimension) of the ultrasound transducer. The rocking movement is shown using a gradient in which the darker side of an indicator 312 represents the desired direction of rocking or tilting to achieve the desired pose or view. Sweeping involves a forward or backward translation of the ultrasound transducer. The sweeping movement is shown by a first indicator 314a and a second indicator 314b spaced from the first indicator 314a in a sweeping direction (e.g., forward/backward). Fanning involves a forward or backward tilt of the ultrasound transducer along a transverse axis that is perpendicular to the lateral axis. The fanning movement is shown similar to the representation for rocking in that the indicator 316 includes a gradient in which the darker side of the indicator 316 represents the desired direction of fanning or tilting to achieve the desired pose or view. Compression involves pressing the ultrasound transducer into the patient along a vertical axis of the ultrasound probe. Accordingly, compression involves applying increased force to the ultrasound probe in a downward direction along the vertical axis. By contrast, decompression involves reducing the pressure or force applied to the patient by the ultrasound probe. The compression motion is illustrated by an outline displayed around an indicator 318 of the ultrasound transducer. The decompression motion is illustrated by a dashed outline around the indicator 321. In some aspects, the boldness, width, color, or other visual aspect of the outlines may correspond to the amount of compression/decompression needed to achieve the desired view. The rotation movement involves rotating the ultrasound transducer about the vertical axis of the ultrasound probe to a particular angular orientation. The rotation movement may be shown by an indicator 320, such as the second indicator, being oriented or rotated relative to the other indicator to the angular orientation associated with the desired pose. In some embodiments, the indicator 320 of representative of rotation includes an arrow. However, in other embodiments, the indicator 320 does not include an arrow.

Referring again to FIG. 3, in step 250, the processor circuit outputs the graphical representation of the movement to a display in communication with the processor circuit. In that regard, FIGS. 7-12 are exemplary graphical user interfaces including the graphical representation of a movement determined to achieve a desired pose or view, according to aspects of the present disclosure. In some embodiments, the processor circuit is configured to display the graphical user interfaces of FIGS. 7-12 once the user has positioned the ultrasound transducer at the position indicated in the graphical interfaces shown in FIG. 4A and/or FIG. 4B. The graphical user interfaces of FIGS. 7-12 are shown using a two-dimensional coordinate system, specifically a cartesian plane. However, in other embodiments, other types of interfaces can be shown that use a variety of different coordinate systems (e.g., polar, cylindrical, spherical).

Figure 7:
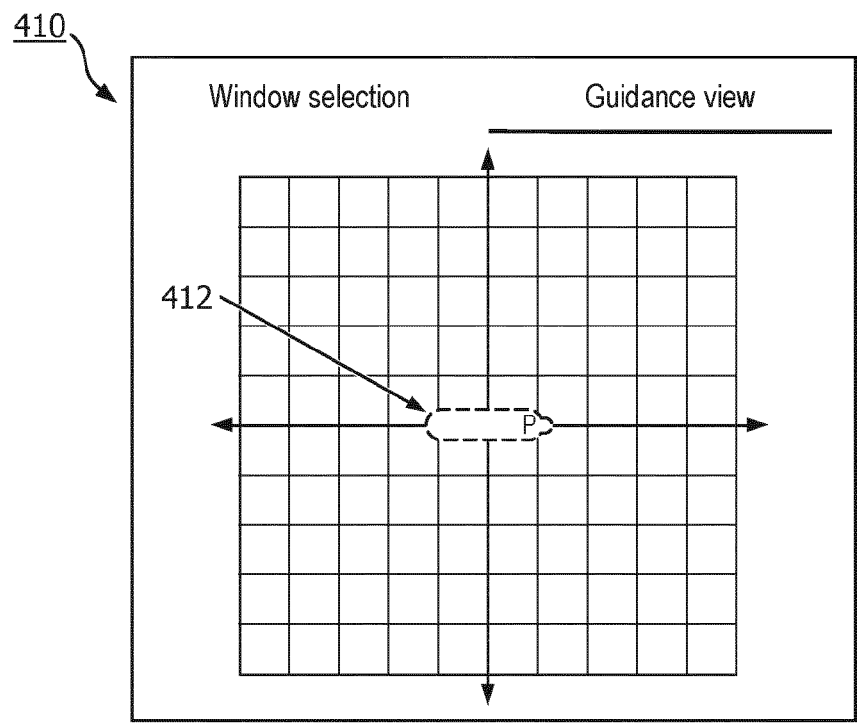
FIG. 7 is a graphical user interface of a guidance step of an image-guided ultrasound imaging procedure, according to aspects of the present disclosure.

FIG. 7 is an exemplary view of graphical user interface 410 used in an ultrasound imaging guidance procedure, according to aspects of the current disclosure. FIG. 7 shows a first indicator 412 of a current pose of an ultrasound transducer centered in a cartesian coordinate system. In some aspects, showing the current pose of the ultrasound transducer at least initially at the center of the cartesian plane may advantageously provide for more intuitive instructions to be displayed for moving the transducer. For example, with the transducer-centric approach shown in FIG. 7, the operator of the transducer may be able to perform the instructed movements with fewer mental translations or transformations by following the indicator(s) 412 displayed to move the transducer to align the current pose with the desired pose. However, it will be understood that, in other embodiments, the indicator 412 showing the initial or current view of the ultrasound transducer is not at the center of the cartesian plane. For example, in some embodiments, a second indicator associated with the desired pose of the ultrasound transducer is displayed at the center of the cartesian plane.

Figure 8:
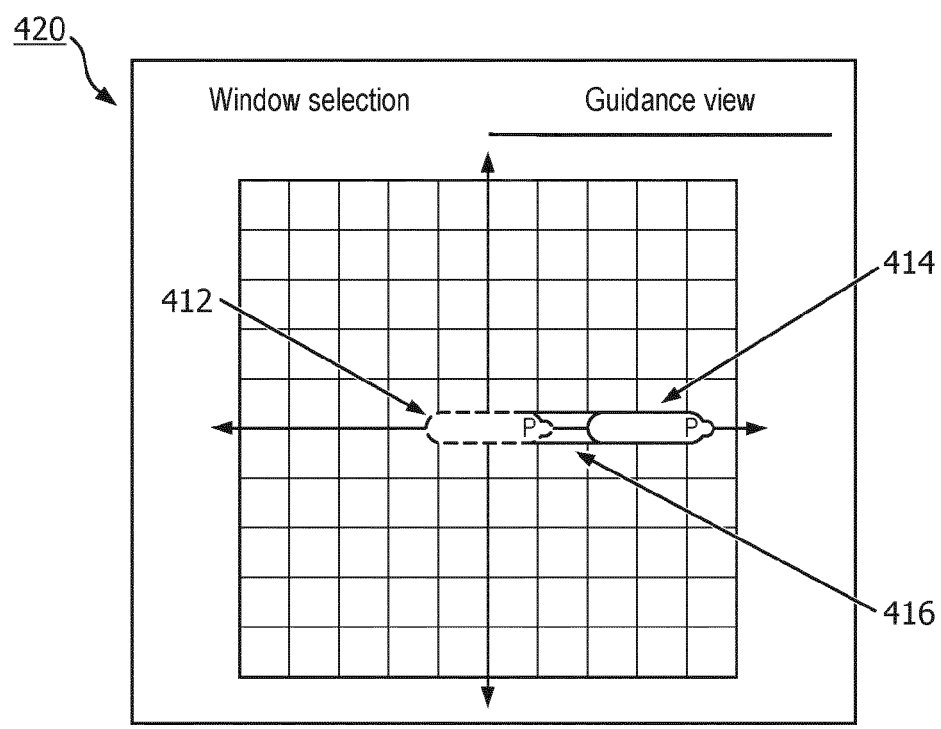
FIG. 8 is a graphical user interface of a lateral sliding step of an image-guided ultrasound imaging procedure, according to aspects of the present disclosure.

FIG. 8 shows a graphical user interface 420, according to aspects of the current disclosure. In that regard, FIG. 8 shows a first indicator 412 of the current and/or initial pose of the ultrasound transducer at the center of the cartesian plane, as in FIG. 7, and further includes a second indicator 414 associated with a desired pose of the ultrasound transducer spaced with respect to the first indicator 412. In the illustrated embodiment, the first indicator 412 and the second indicator 414 comprise a same shape, which represents a shape of an ultrasound transducer array. However, in some embodiments, one or both of the indicators may comprise a different shape. The second indicator 414 is laterally spaced from the first indicator 412, representing an instruction to slide the ultrasound transducer laterally to the right. The second indicator 414 further includes a gradient showing a darker color on the right side of the second indicator, representing a rocking movement to the right along the lateral axis of the ultrasound transducer. Accordingly, the second indicator represents multiple types of movements (i.e., sliding and rocking) that can be performed simultaneously or separately by the operator. The graphical user interface 420 also has a third indicator 416 including a partially transparent track or path of movement to bring the ultrasound transducer from its initial or current pose to the desired pose. In some embodiments, the third indicator 416 comprises an arrow or another type of directional indicator. In other embodiments, the third indicator 416 is not shown.

Figure 9:
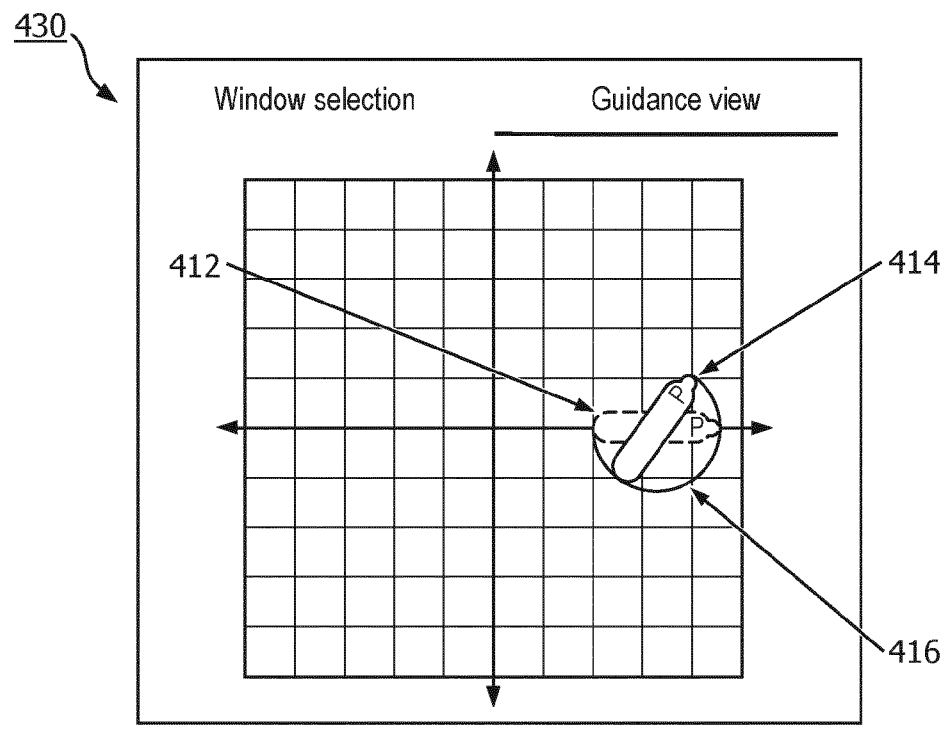
FIG. 9 is a graphical user interface of a rotation step of an image-guided ultrasound imaging procedure, according to aspects of the present disclosure.

In some embodiments, one or more of the indicators 412, 414, 416 is updated by the processor circuit in response to the processor circuit detecting that the ultrasound transducer has moved. For example, in some embodiments, the processor circuit is configured to receive a continuous stream of ultrasound imaging data and detect changes in the pose of the ultrasound transducer and update the first indicator 412 to provide a real-time view of the pose of the ultrasound transducer relative to the desired pose. In some embodiments, the second indicator 414 may be displayed such that all movements or adjustments involved in achieving the desired pose (e.g., sliding, fanning, rocking, sweeping, etc.) are shown at once such that a position and/or orientation of the second indicator 414 with respect to the cartesian plane does not change. However, in other embodiments, one or more aspects of the second indicator 414, such as its position, orientation, gradients, etc., are updated in a stepwise or incremental fashion as the ultrasound transducer is advanced to different steps during navigation. In that regard, FIG. 9 shows a graphical user interface 430 in which the first and second indicators 412, 414 are updated in response to detecting that the ultrasound transducer has been moved as instructed by the graphical user interface 420 of FIG. 8. Specifically, the first indicator 412 is shown in FIG. 9 as partially overlapping the second indicator 414. The second indicator 414 is also updated to represent the following movement instruction, which involves a rotation of the ultrasound transducer in a clockwise motion about 120 degrees. Further, the second indicator 414 simultaneously shows a rocking motion by a gradient applied across the lateral axis of the second indicator 414.

Figure 10:
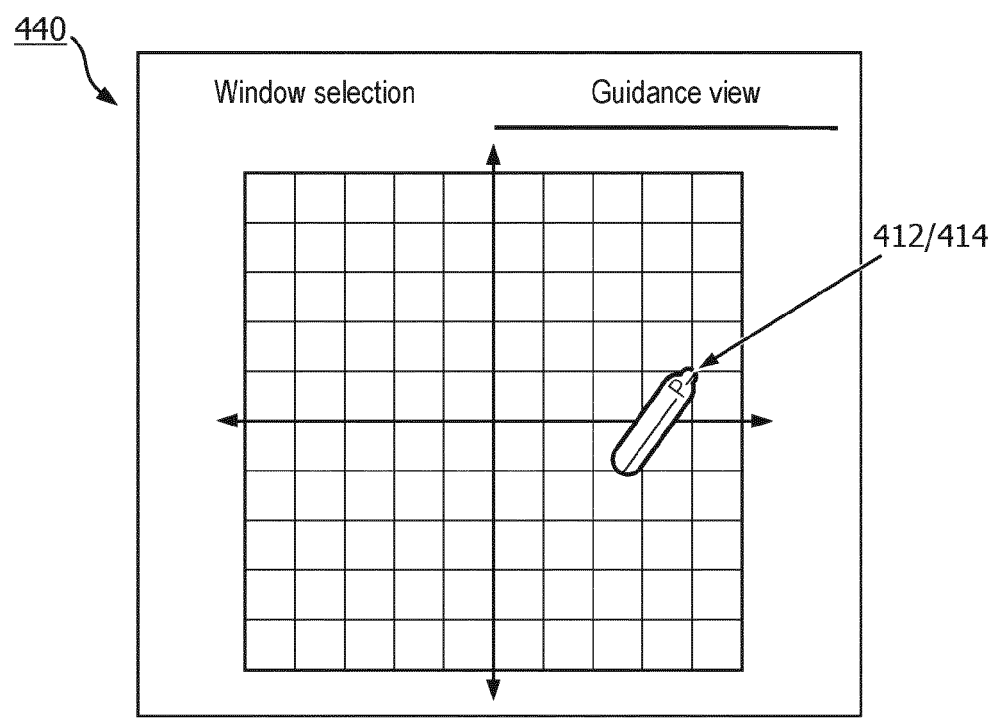
FIG. 10 is a graphical user interface of a fanning step of an image-guided ultrasound imaging procedure, according to aspects of the present disclosure.
Figure 11:
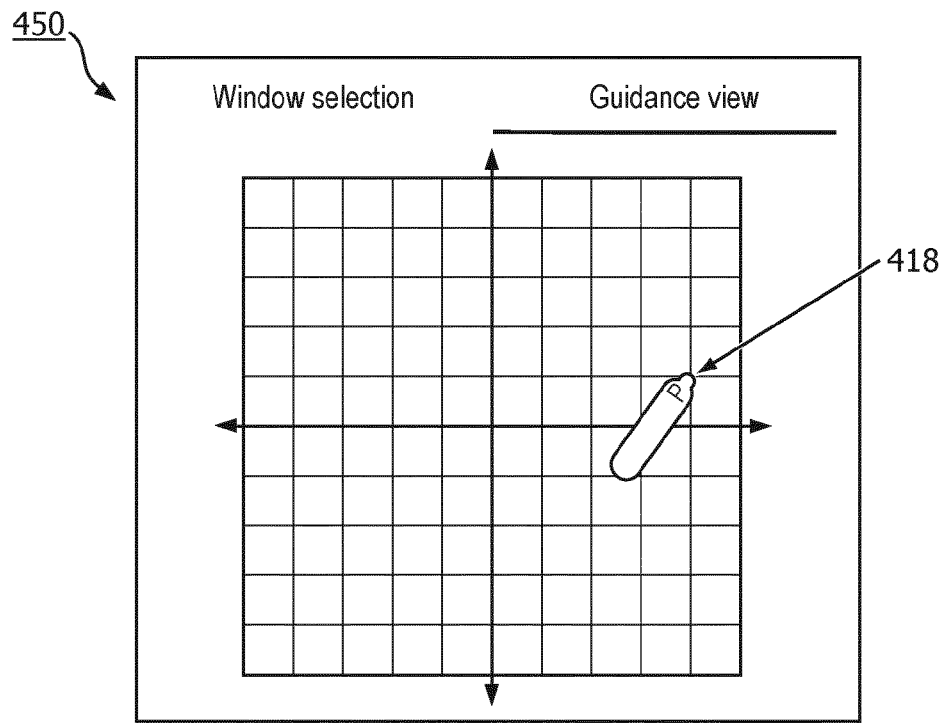
FIG. 11 is a graphical user interface showing a completed movement indicator of an image-guided ultrasound imaging procedure, according to aspects of the present disclosure.

Once the operator has completed the movements instructed by the indicators 412, 414 shown in FIGS. 8 and 9, the second indicator 414 is updated to instruct the operator to make a fanning movement, as shown in the graphical user interface 440 of FIG. 10. The fanning movement is represented by a gradient along the transverse axis of the indicator 412/414 of the ultrasound transducer. In some embodiments, the gradient involves multiple colors, darkness values, intensities, grayscales, patterns, or other visual features of the indicator. In some embodiments, the fanning can be represented by other types of graphical indicators, such as arrows, a different shape of the indicator, and/or any other suitable type of graphical representation. Once the desired pose has been achieved such that an image of the desired imaging plane can be acquired, the graphical user interface 440 is updated to indicate that the movement is complete. FIG. 11 shows an updated graphical user interface 450 in which the movement is determined by the processor circuit to be complete, according to an embodiment of the present disclosure. In the illustrated embodiment, only a single indicator 418 is shown at the desired pose. No further visual indicators or graphical representations (e.g., gradients, arrows, partially transparent paths) are shown, as the movements have been completed and the desired pose has been achieved. In some embodiments, the processor circuit is configured to provide other types of indicators to notify the operator that the desired pose has been achieved, including visual, audible, and/or haptic indicators. For example, in some embodiments, a textual indicator is displayed indicating that the desired pose has been achieved. In other embodiments, a light is activated, or a sound is played by a speaker to indicate that the desired pose has been achieved.

Figure 12:
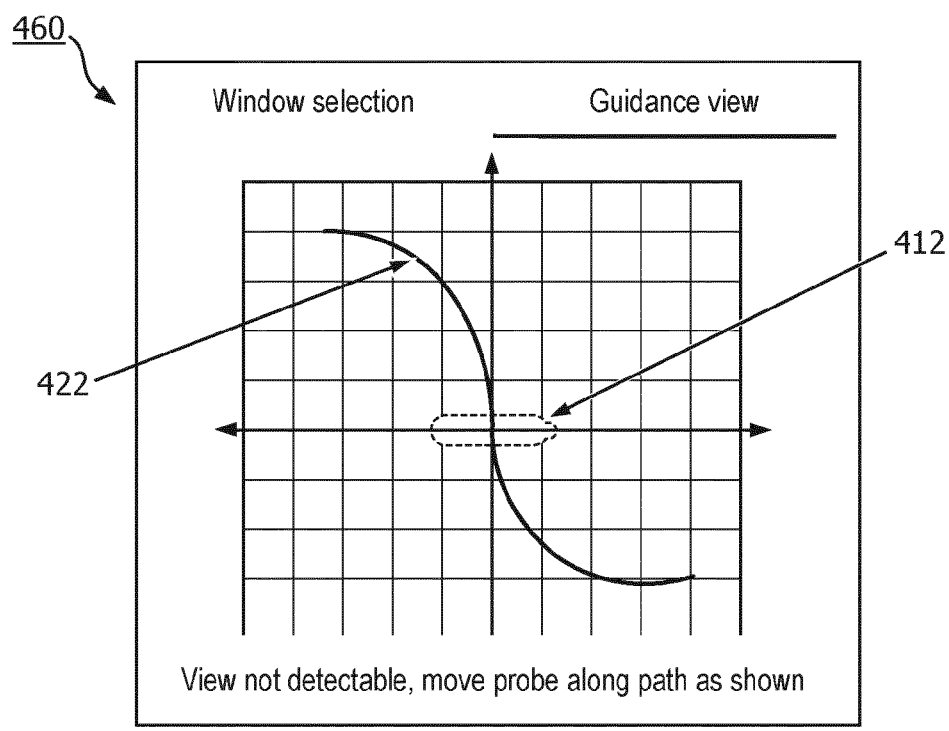
FIG. 12 is a graphical user interface showing a troubleshooting step of an image-guided ultrasound imaging procedure, according to aspects of the present disclosure.

In some instances, the processor circuit may not be able to determine a current pose of the ultrasound transducer or may lose track of the current pose of the ultrasound transducer during movement. For example, in some instances, ribs or other anatomical features may block a portion of the field of view of the ultrasound transducer. In other instances, the ultrasound transducer may have insufficient contact or acoustic coupling with the patient such that the processor cannot resolve the anatomical features within the field of view. Accordingly, in some embodiments, the processor circuit is configured to update the graphical user interface to instruct the user to perform one or more movements to allow the processor circuit to determine the current pose of the ultrasound transducer. In that regard, FIG. 12 shows an exemplary embodiment of a graphical user interface 460 that includes a first indicator 412 positioned at the center of a cartesian coordinate system and an instruction to move an ultrasound transducer along an S-shaped path 422 to assist the processor circuit to determine the current pose of the ultrasound transducer relative to the patient's anatomy. In other embodiments, other types of paths are displayed, such as figure eight paths, diagonal paths, lateral paths, longitudinal paths, circular paths, etc. Further, in some embodiments, the graphical user interface 460 includes an instruction—in the probe space—to fan, sweep, rock, rotate, and/or compress the ultrasound transducer against the patient. Instructions can be also provided in the patient or heart anatomy space. For example, user may be instructed to slide the probe left towards the sternum, or slightly rotate the probe counterclockwise to align a probe marker with the right shoulder and stop as soon the right ventricle becomes visible. Instructions can be also provided regarding patient positioning. For example, if the quality of the image is poor (e.g. due to inadequate compression), an instruction can be provided to position the patient in the supine position, and to abduct the patient's left arm to open intercostal space. Instruction can also be provided regarding adjustment of the imaging settings, such as depth, gain, TGC curve, etc., which may also affect the performance of the algorithm. The graphical user interface 460 may be updated to indicate that the view is not detectable automatically in response to a fault condition in which the ultrasound images or imaging data analyzed by the processor circuit cannot be correlated with a known view of a model or database, for example. Similarly, upon detecting the current view again, the processor circuit may automatically update the graphical user interface 460 to indicate the next movement instruction in the guidance process.

Figure 13:
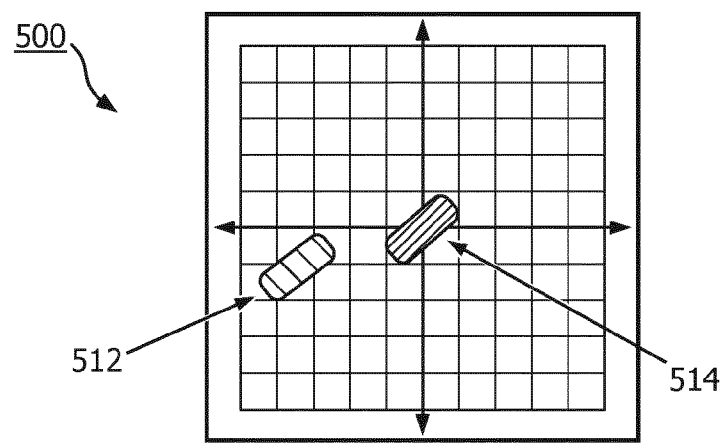
FIG. 13 is a graphical user interface of a guidance step of an image-guided ultrasound imaging procedure, according to aspects of the present disclosure.
Figure 14:
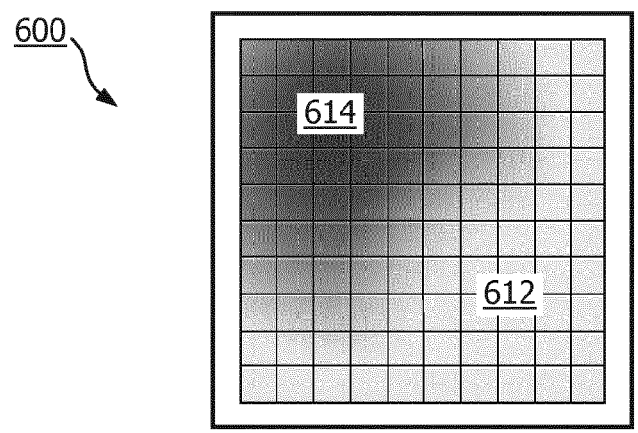
FIG. 14 is a graphical user interface of a guidance step of an image-guided ultrasound imaging procedure, according to aspects of the present disclosure.
Figure 15:
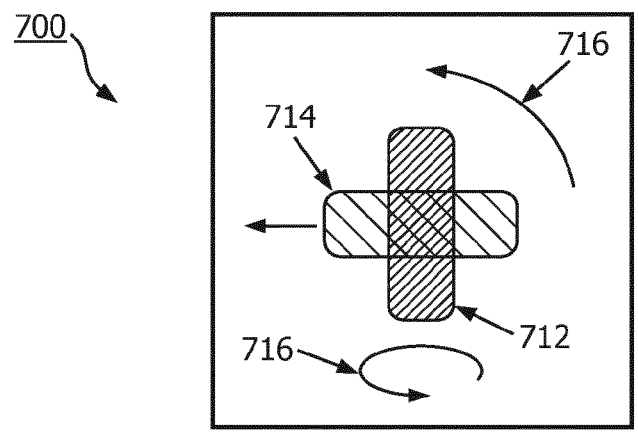
FIG. 15 is a graphical user interface of a guidance step of an image-guided ultrasound imaging procedure, according to aspects of the present disclosure.

FIGS. 13-15 illustrate additional embodiments of graphical user interfaces used in an ultrasound guidance procedure. In that regard, FIG. 13 is a graphical user interface 500 in which a first indicator 512, which corresponds to a current pose of the ultrasound transducer, is spaced from the center of the cartesian coordinate system, and a second indicator 514 corresponding to a desired pose of the ultrasound transducer is centered in the cartesian coordinate system. The graphical user interface 500 shown in FIG. 13 comprises many similarities to the embodiments shown in FIGS. 7-12, including separate indicators 512, 514 for the current and desired pose of the ultrasound transducer, the shapes of the indicators, the cartesian coordinate system, the gradients and graphical representations of the various movements, etc. The graphical user interface 600 shown in FIG. 14 includes a gradient field 612 illustrated by a plurality of gradually changing colors, shades, and/or patterns that can similarly be used to indicate a movement. For example, a region 614 of the graphical user interface 600 may comprise a lighter color or shade, indicating to the operator to move the transducer toward the lighter region 614. As the user moves the transducer toward the region 614, the graphical user interface 600 may be updated such that the lighter region 614 becomes smaller and converges around the ultrasound transducer. The shape of the lighter region 614 may indicate other types of movements, such as fanning, rocking, and/or rotating. FIG. 15 illustrates another embodiment of a graphical user interface 700 used in an ultrasound guidance procedure in which arrows 716 are used to indicate different types of movements. In the illustrated embodiment, the arrows 716 are shown around a first indicator 712 representative of a current pose of the ultrasound transducer, and a second indicator 714 representative of a desired pose of the ultrasound transducer. In that regard, the arrows may be used in addition to, or instead of, the indicators 712, 714.

A person of skill in the art will understand that the particular embodiments illustrated above are exemplary and are not intended to limit the scope of the present disclosure. In that regard, a variety of modifications, substitutions, and/or combinations could be made with respect to the embodiments described above without departing from the scope of the present disclosure. It will also be understood that one or more of the steps of the method 200 described above may be performed by one or more components of an ultrasound imaging system, such as a processor or processor circuit, a multiplexer, a beamformer, a signal processing unit, an image processing unit, or any other suitable component of the system. For example, one or more steps described above may be carried out by the processor circuit 150 described with respect to FIG. 2. The processing components of the system can be integrated within an ultrasound imaging device, contained within an external console, or may be distributed between various components of the system. Although one or more of the examples of graphical user interfaces, indicators, and representations described above are shown as two-dimensional and may be formatted for two-dimensional display devices, the graphical user interfaces, indicators, and representations described above may also comprise three-dimensional visualizations formatted for three-dimensional display devices, such as augmented reality devices, virtual reality devices, 3D-capable monitors, etc.

Persons skilled in the art will recognize that the apparatus, systems, and methods described above can be modified in various ways. Accordingly, persons of ordinary skill in the art will appreciate that the embodiments encompassed by the present disclosure are not limited to the particular exemplary embodiments described above. In that regard, although illustrative embodiments have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. An apparatus for guiding an ultrasound imaging procedure, comprising:
   a processor circuit configured for communication with an ultrasound transducer performing the ultrasound imaging procedure, wherein the processor circuit is configured to:
      receive, from a user interface, an input associated with a desired pose of the ultrasound transducer, wherein the ultrasound transducer is positioned at a current pose;
      receive, from the ultrasound transducer, ultrasound imaging data representative of a field of view of the ultrasound transducer in the current pose;
      determine, based on the ultrasound imaging data and the input, a movement to align the current pose of the ultrasound transducer with the desired pose;
      generate guidance for a user to move the ultrasound transducer while the ultrasound imaging procedure is ongoing, wherein the guidance for the user comprises a two-dimensional (2D) graphical representation of the movement, wherein the 2D graphical representation comprises:
         a two-dimensional (2D) coordinate plane comprising an x-axis, a y-axis, and gridlines associated with the x-axis and the y-axis;
         a first indicator of the current pose of the ultrasound transducer; and
         a second indicator of the desired pose of the ultrasound transducer positioned and oriented relative to the first indicator to indicate the movement,
         wherein the first indicator and the second indicator each comprise a 2D shape located within the 2D coordinate plane and representative of 2D profile of the ultrasound transducer such that the 2D graphical representation comprises a top-down view of the ultrasound transducer within the 2D coordinate plane; and
      output the 2D graphical representation to a display in communication with the processor circuit.

2. The apparatus of claim 1, wherein the processor circuit is configured to:
   detect a change in the current pose of the ultrasound transducer; and
   update at least one of the first indicator or the second indicator of the 2D graphical representation based on the detected change in the current pose.

3. The apparatus of claim 2, wherein the processor circuit is configured to update, in real time, the first indicator based on the detected change in the current pose.

4. The apparatus of claim 2, wherein the processor circuit is configured to detect the change in the current pose of the ultrasound transducer based on the ultrasound imaging data using a machine learning algorithm.

5. The apparatus of claim 2,
   wherein the apparatus further comprises a position sensor configured to obtain position data of the ultrasound transducer, and
   wherein the processor circuit is configured to detect the change in the current pose of the ultrasound transducer based on the position data.

6. The apparatus of claim 1, wherein the first indicator and the second indicator comprise a same shape.

7. The apparatus of claim 1,
   wherein the movement comprises two or more adjustments of the ultrasound transducer including a lateral sliding movement, a sweeping movement, a rocking movement, a fanning movement, a rotational movement, a compression movement, or a decompression movement, and
   wherein the second indicator graphically represents the two or more adjustments of the ultrasound transducer simultaneously.

8. The apparatus of claim 1,
   wherein the user interface comprises a touch-screen display, and
   wherein the input is received based on a view selected on the touch-screen display.

9. The apparatus of claim 1, wherein the second indicator comprises a gradient representative of at least one of a rocking movement or a fanning movement.

10. The apparatus of claim 1, wherein the processor circuit is configured to:
    determine that the current pose of the ultrasound transducer is aligned with the desired pose; and
    in response to determining that the current pose is aligned with the desired pose, save, to a memory of the processor circuit, an image frame.

11. A method for guiding an ultrasound imaging procedure, comprising:
    receiving, from a user interface, an input associated with a desired pose of an ultrasound transducer performing the ultrasound imaging procedure, wherein the ultrasound transducer is positioned at a current pose;
    receiving, from the ultrasound transducer, ultrasound imaging data representative of a field of view of the ultrasound transducer in a current pose;
    determining, based on the ultrasound imaging data and the input, a movement to align the current pose of the ultrasound transducer with the desired pose;
    generating guidance for a user to move the ultrasound transducer while the ultrasound imaging procedure is ongoing, wherein the guidance for the user comprises a two-dimensional (2D) graphical representation of the movement, wherein the 2D graphical representation comprises:
       a two-dimensional (2D) coordinate plane comprising an x-axis, a y-axis, and gridlines associated with the x-axis and the y-axis;
       a first indicator of the current pose of the ultrasound transducer; and
       a second indicator of the desired pose of the ultrasound transducer positioned and oriented relative to the first indicator to indicate the movement,
       wherein the first indicator and the second indicator each comprise a 2D shape located within the 2D coordinate plane and representative of 2D profile of the ultrasound transducer such that the 2D graphical representation comprises a top-down view of the ultrasound transducer within the 2D coordinate plane; and outputting the graphical representation to a display.

12. The method of claim 11, further comprising:
detecting a change in the current pose of the ultrasound transducer; and
updating at least one of the first indicator or the second indicator of the 2D graphical representation based on the detected change in the current pose.

13. The method of claim 12, wherein updating the at least one of the first indicator or the second indicator comprises updating, in real time, the first indicator based on the detected change in the current pose.

14. The method of claim 12, wherein detecting the change in the current pose of the ultrasound transducer comprises detecting the change in the current pose of the ultrasound transducer based on the ultrasound imaging data using a machine learning architecture.

15. The method of claim 12, wherein detecting the change in the current pose of the ultrasound transducer comprises detecting the change in the current pose of the ultrasound transducer based on position data received from a position sensor.

16. The method of claim 11, wherein the first indicator and the second indicator comprise a same shape.

17. The method of claim 11,
wherein the movement comprises two or more adjustments of the ultrasound transducer including a lateral sliding movement, a sweeping movement, a rocking movement, a fanning movement, a rotational movement, or a compression movement, and
wherein the second indicator graphically represents the two or more adjustments of the ultrasound transducer simultaneously.

18. The method of claim 11, wherein the second indicator comprises a gradient representative of at least one of a rocking movement or a fanning movement.

19. The method of claim 11, further comprising:
determining that the current pose of the ultrasound transducer is aligned with the desired pose; and
in response to determining that the current pose is aligned with the desired pose, saving, to a memory device, an image frame.

20. An ultrasound imaging system comprising:
an ultrasound probe comprising an ultrasound transducer array;
a user display configured to display a graphical user interface;
a user interface device configured to receive one or more inputs; and
a processor circuit in communication with the ultrasound probe performing the ultrasound imaging procedure, the user interface device, and the user display, wherein the processor circuit is configured to:
receive, from the user interface, an input associated with a desired pose of the ultrasound transducer, wherein the ultrasound transducer is positioned at a current pose;
receive, from the ultrasound transducer, ultrasound imaging data representative of a field of view of the ultrasound transducer in the current pose;
determine, based on the ultrasound imaging data, the current pose of the ultrasound probe;
compute, based on the current pose and the desired pose, a movement to align the current pose of the ultrasound probe with the desired pose;
generate guidance for a user to move the ultrasound transducer while the ultrasound imaging procedure is ongoing, wherein the guidance for the user comprises a two-dimensional (2D) graphical representation of the movement, wherein the 2D graphical representation comprises:
a two-dimensional (2D) coordinate plane comprising an x-axis, a y-axis, and gridlines associated with the x-axis and the y-axis;
a first indicator of the current pose of the ultrasound probe, wherein the first indicator comprises a 2D shape overlaid on the 2D coordinate plane; and
a second indicator of the desired pose of the ultrasound probe, wherein the second indicator comprises the 2D shape overlaid on the 2D coordinate plane,
wherein the second indicator is positioned and oriented relative to the first indicator to indicate the movement, and
wherein the 2D graphical representation comprises a top-down view of the ultrasound transducer within the 2D coordinate plane; and
output the graphical representation to the user display.

* * * * *